United States Patent
Jo et al.

(10) Patent No.: US 11,019,527 B2
(45) Date of Patent: May 25, 2021

(54) METHOD FOR TRANSMITTING TCP ACK PACKET IN WIRELESS COMMUNICATION SYSTEM AND A DEVICE THEREFOR

(71) Applicant: LG Electronics Inc., Seoul (KR)

(72) Inventors: Geumsan Jo, Seoul (KR); Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/490,513

(22) PCT Filed: Feb. 23, 2018

(86) PCT No.: PCT/KR2018/002260
§ 371 (c)(1),
(2) Date: Aug. 30, 2019

(87) PCT Pub. No.: WO2018/159959
PCT Pub. Date: Sep. 7, 2018

(65) Prior Publication Data
US 2020/0128431 A1   Apr. 23, 2020

Related U.S. Application Data

(60) Provisional application No. 62/465,648, filed on Mar. 1, 2017.

(51) Int. Cl.
*H04W 4/00*        (2018.01)
*H04W 28/02*       (2009.01)
(Continued)

(52) U.S. Cl.
CPC ....... *H04W 28/0268* (2013.01); *H04L 5/0055* (2013.01); *H04W 28/0263* (2013.01);
(Continued)

(58) Field of Classification Search
CPC ......... H04W 28/0268; H04W 28/0263; H04W 28/0273; H04W 72/1284; H04W 80/12; H04W 80/06; H04L 5/0055; H04L 69/163
(Continued)

(56) References Cited

U.S. PATENT DOCUMENTS

2008/0080464 A1   4/2008 Speight
2016/0227564 A1   8/2016 Stephenne et al.
(Continued)

OTHER PUBLICATIONS

PCT International Search Report and Written Opinion in International Appln. No. PCT/KR2018/002260, dated Jun. 19, 2018, 11 pages.
(Continued)

*Primary Examiner* — Chuong T Ho
(74) *Attorney, Agent, or Firm* — Fish & Richardson P.C.

(57) ABSTRACT

The present invention relates to a wireless communication system. More specifically, the present invention relates to a method and a device for transmitting TCP ACK packet in wireless communication system, the method comprising: receiving a packet with a first QoS flow ID for a PDU session from an upper layer, wherein a first DRB for transmitting only TCP ACK packet is configured for the PDU session; checking whether or not the received packet is a TCP ACK packet; and if the received packet is the TCP ACK packet, delivering a PDU including the received packet to a lower layer via the first DRB, wherein the first QoS flow ID of the received packet is associated with a second DRB according to QoS flow to DRB mapping rule of the PDU session.

10 Claims, 12 Drawing Sheets

(51) Int. Cl.
*H04L 5/00* (2006.01)
*H04W 72/12* (2009.01)
*H04W 80/12* (2009.01)

(52) U.S. Cl.
CPC ... *H04W 28/0273* (2013.01); *H04W 72/1284* (2013.01); *H04W 80/12* (2013.01)

(58) Field of Classification Search
USPC .................................................. 370/329, 330
See application file for complete search history.

(56) References Cited

U.S. PATENT DOCUMENTS

| | | | |
|---|---|---|---|
| 2016/0234714 A1* | 8/2016 | Basu Mallick | ....... H04W 16/32 |
| 2016/0295473 A1 | 10/2016 | Lee et al. | |
| 2019/0174356 A1* | 6/2019 | Lin | ................... H04W 28/0273 |
| 2019/0387577 A1* | 12/2019 | Parron | ................ H04L 47/2466 |
| 2020/0059817 A1* | 2/2020 | Baek | ................. H04W 28/0273 |

OTHER PUBLICATIONS

LG Electronics Inc., "QoS flow to DRB mapping," R2-1700284, 3GPP TSG-RAN WG2 NR Ad Hoc, Spokane, USA, dated Jan. 17-19, 2017.

LG Electronics Inc., "Prioritizing TCP ACK transmission," R2-1701463, 3GPP TSG-RAN WG2 #97, Athens, Greece, Feb. 13-17, 2017, 3 pages.

Ericsson, Nokia, ZTE, AT&T, "[23.501] Cleanup of QoS framework description," S2-171623, SA WG2 Meeting #119, Dubrovnik, Croatia, dated Feb. 13-17, 2017, 9 pages.

Extended European Search Report in European Appln. No. 18761821.0, dated Oct. 13, 2020, 11 pages.

* cited by examiner

[Fig. 1]
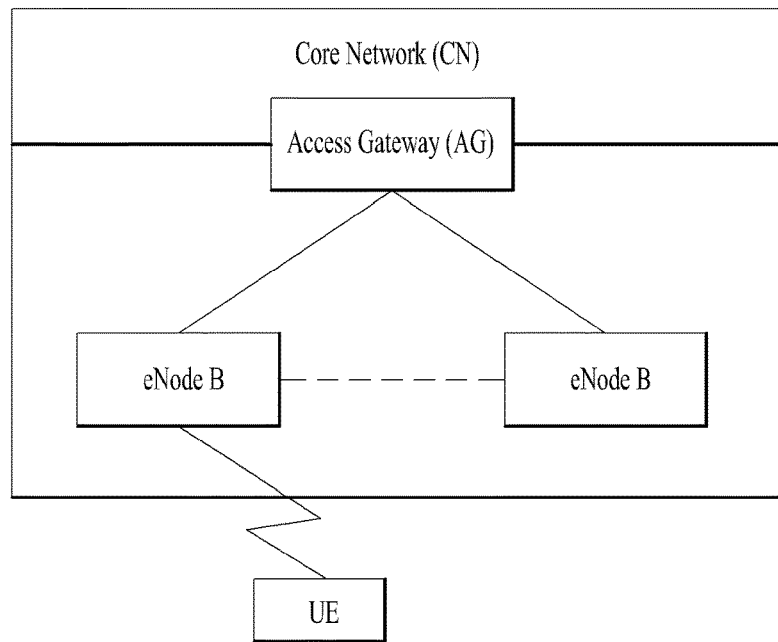
[Fig. 2A]
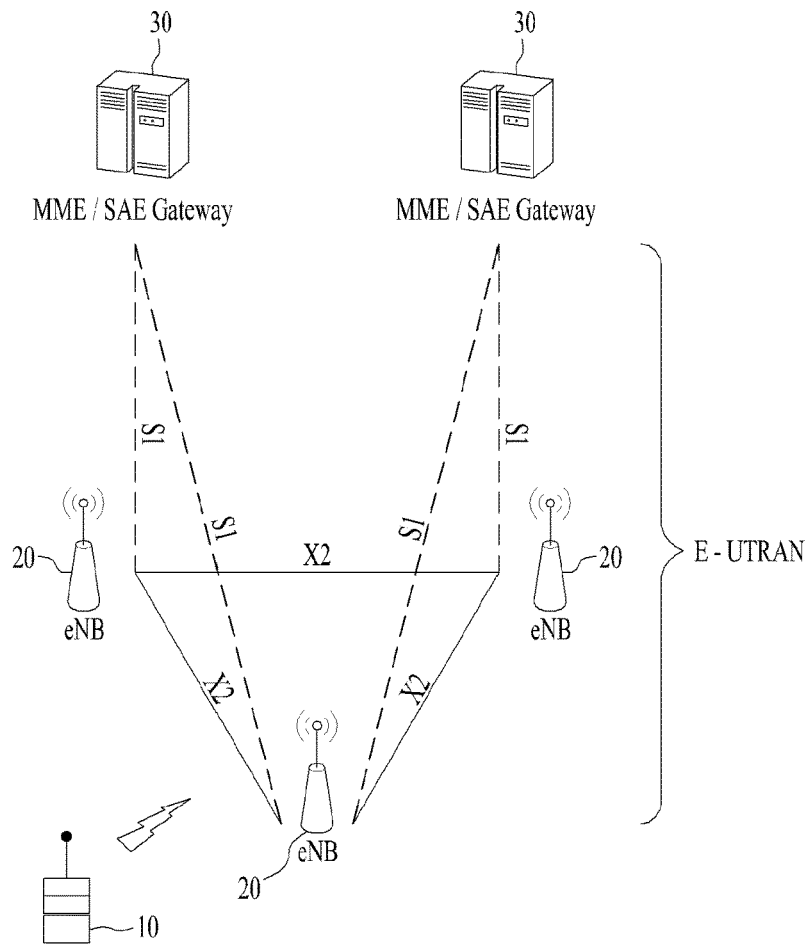

[Fig. 2B]
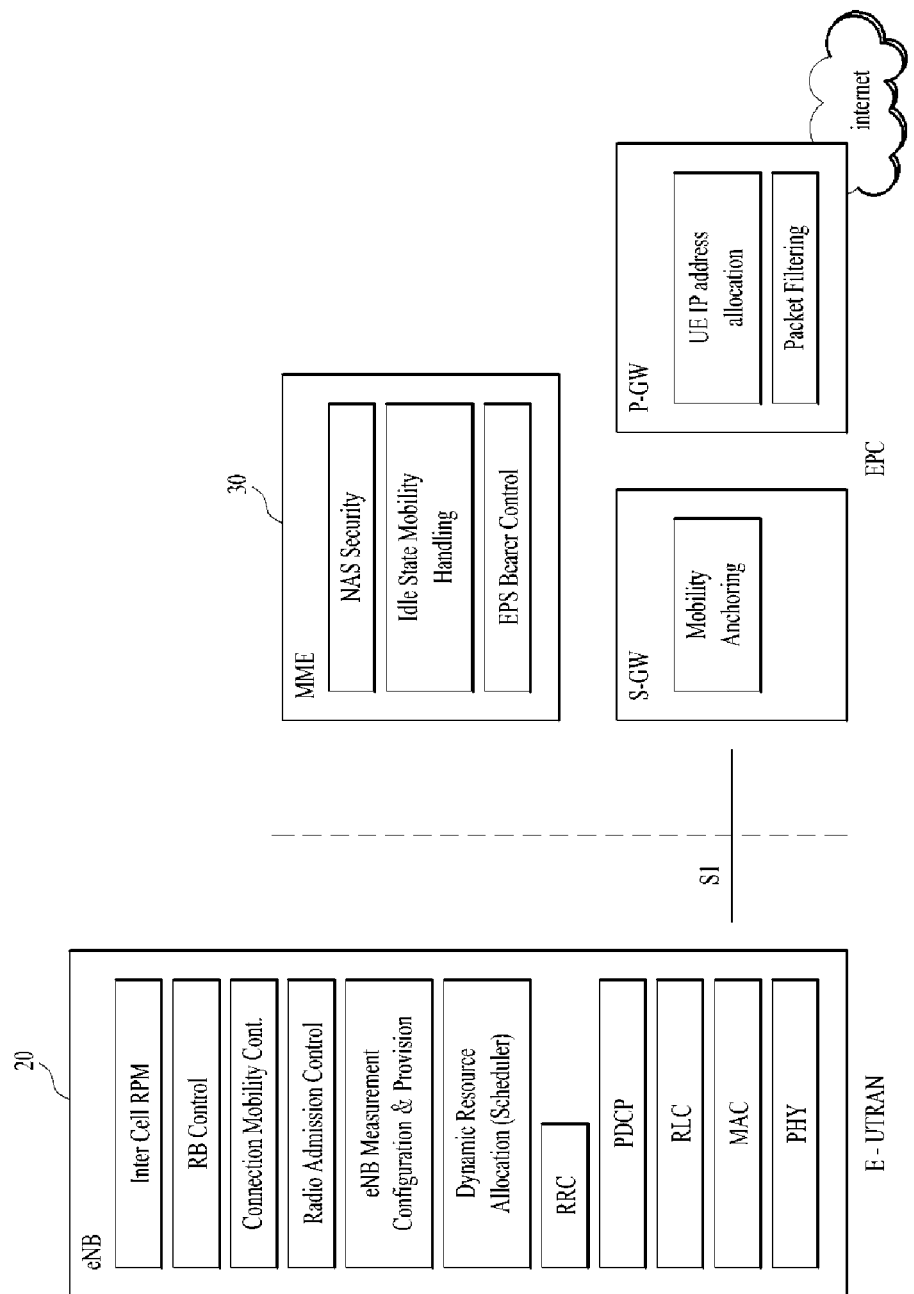

[Fig. 3]
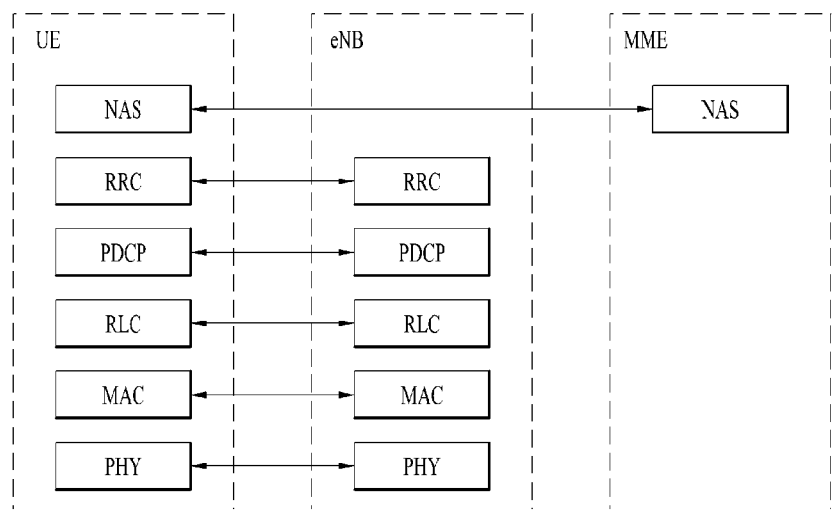
(a) Control-Plane Protocol Stack
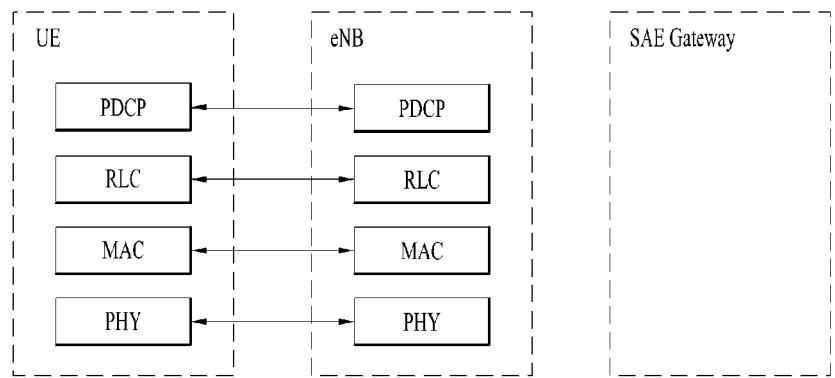
(b) User-Plane Protocol Stack

[Fig. 4a]
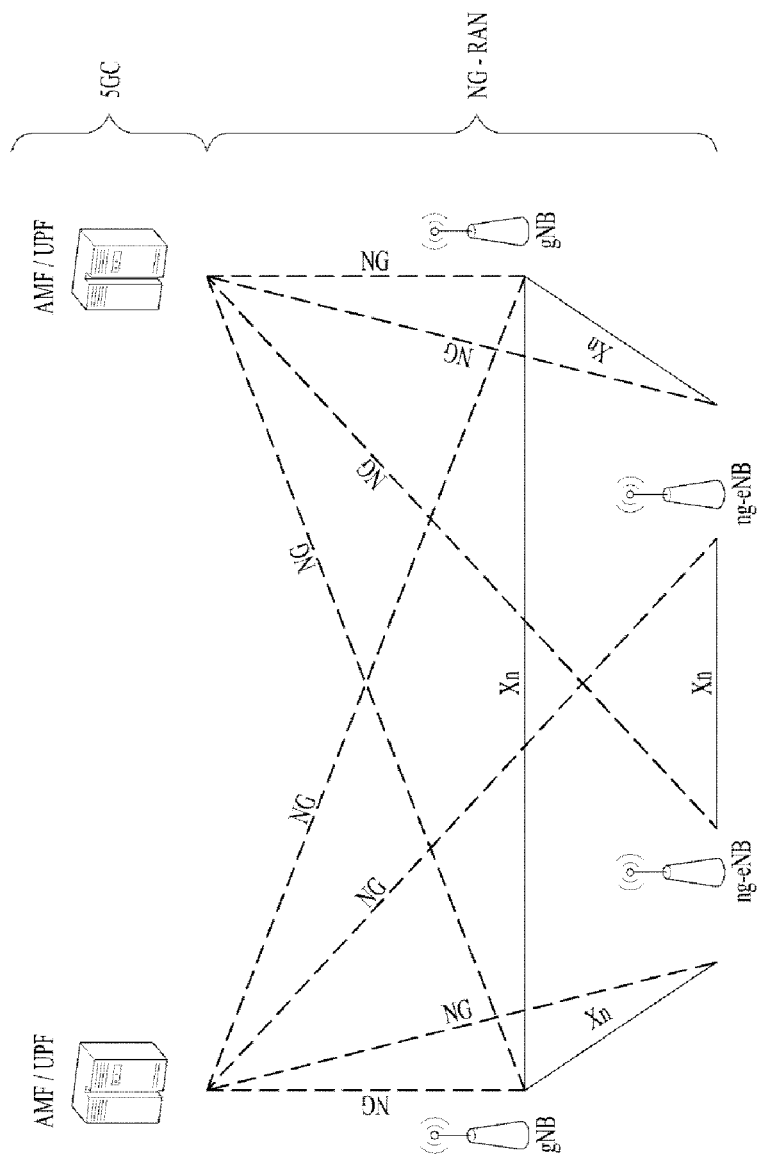

[Fig. 4b]
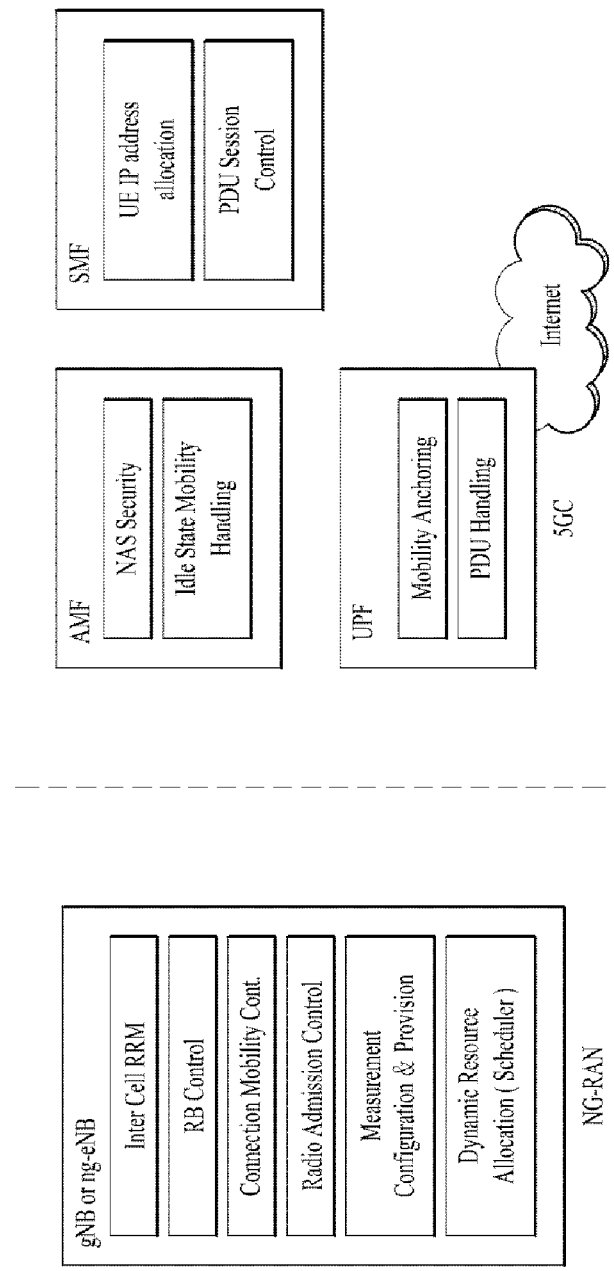

[Fig. 5]
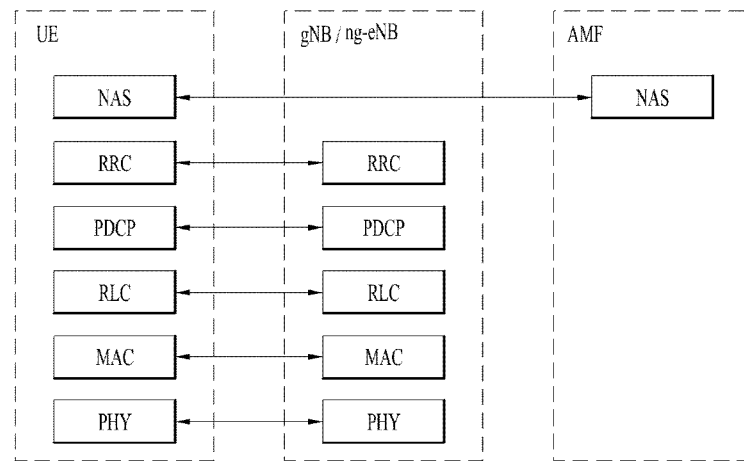
(a) Control-Plane Protocol Stack
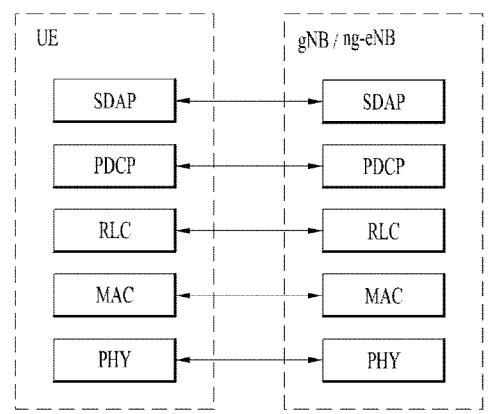
(b) User-Plane Protocol Stack

[Fig. 6]
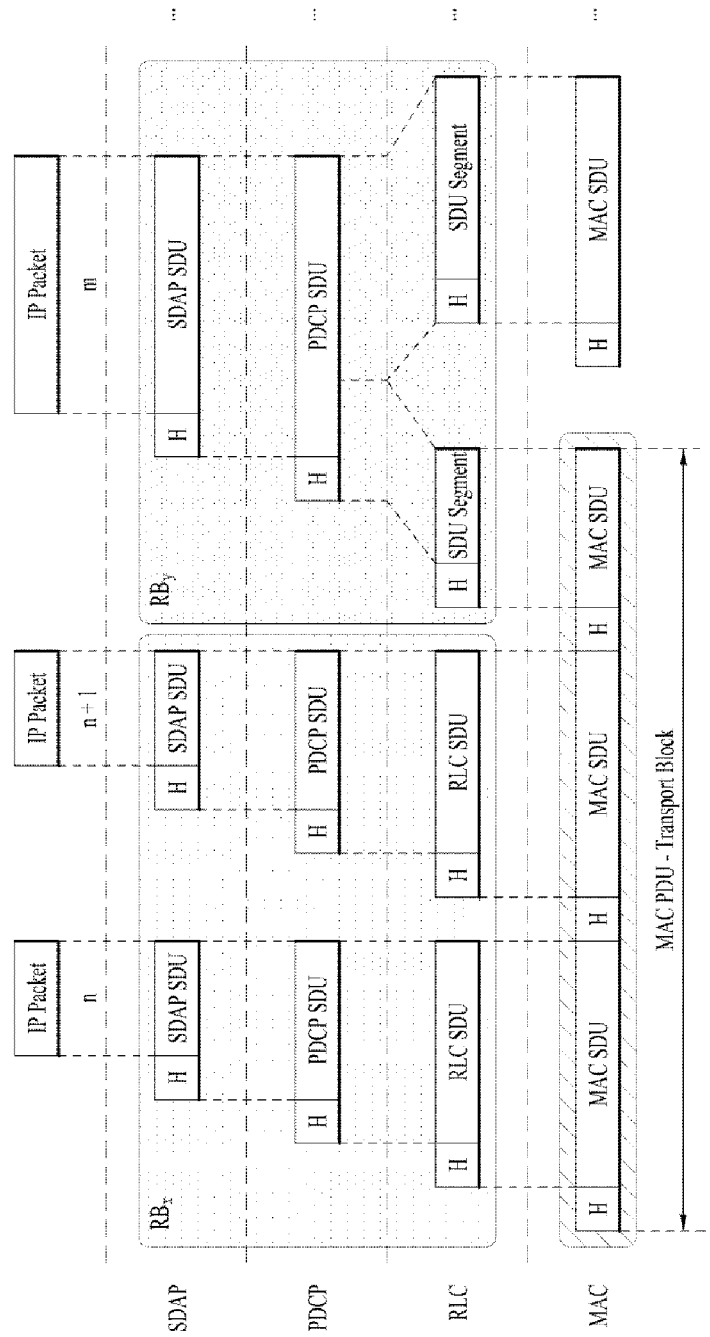

[Fig. 7]
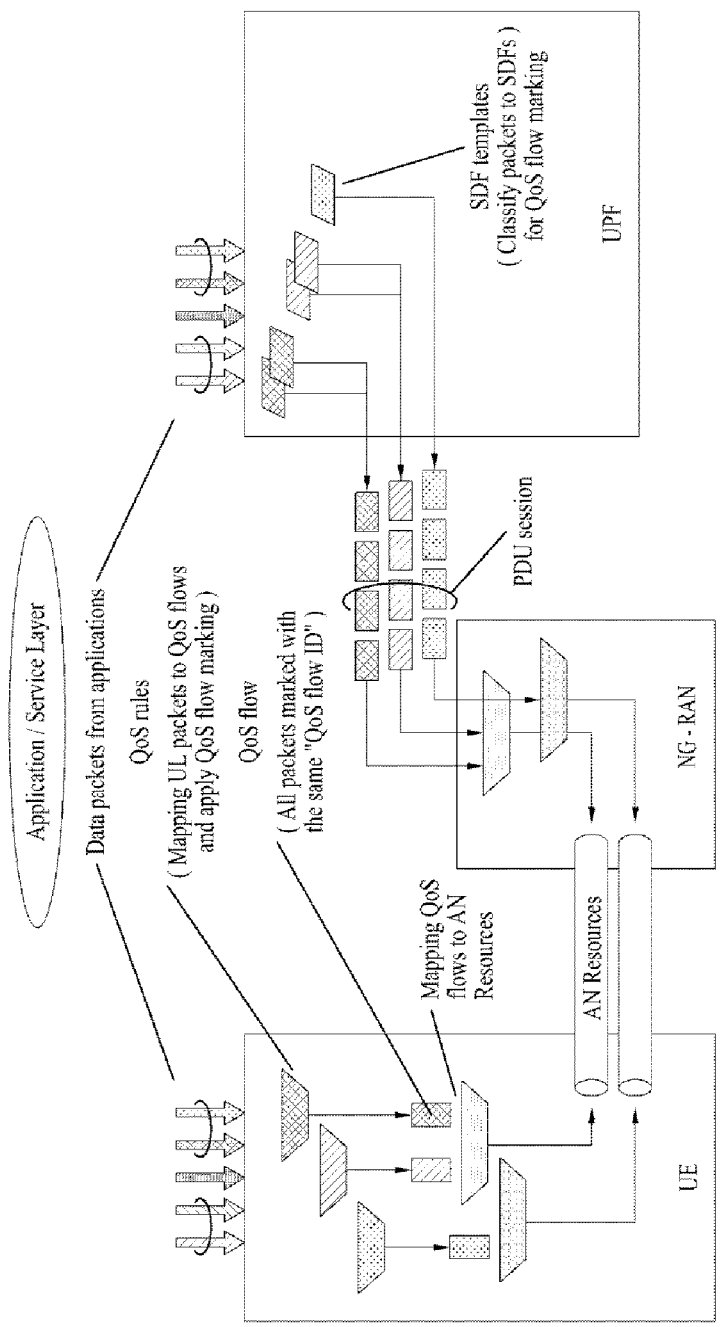

[Fig. 8]
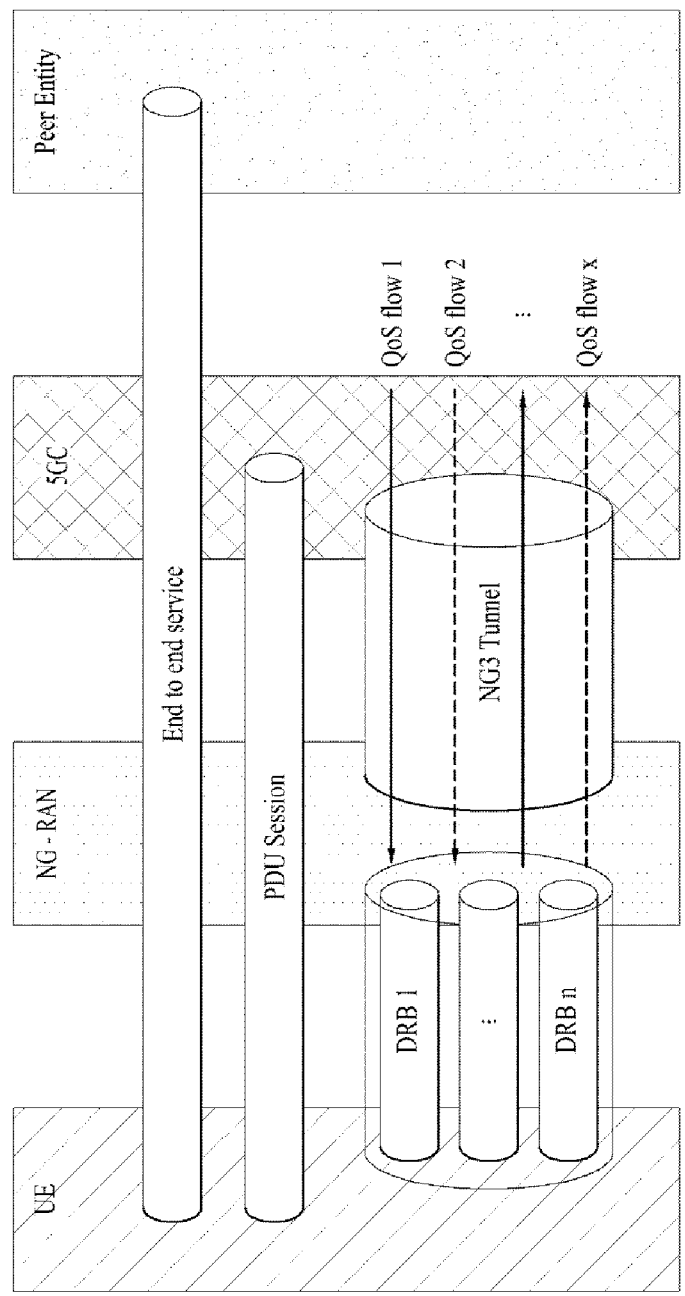

[Fig. 9]
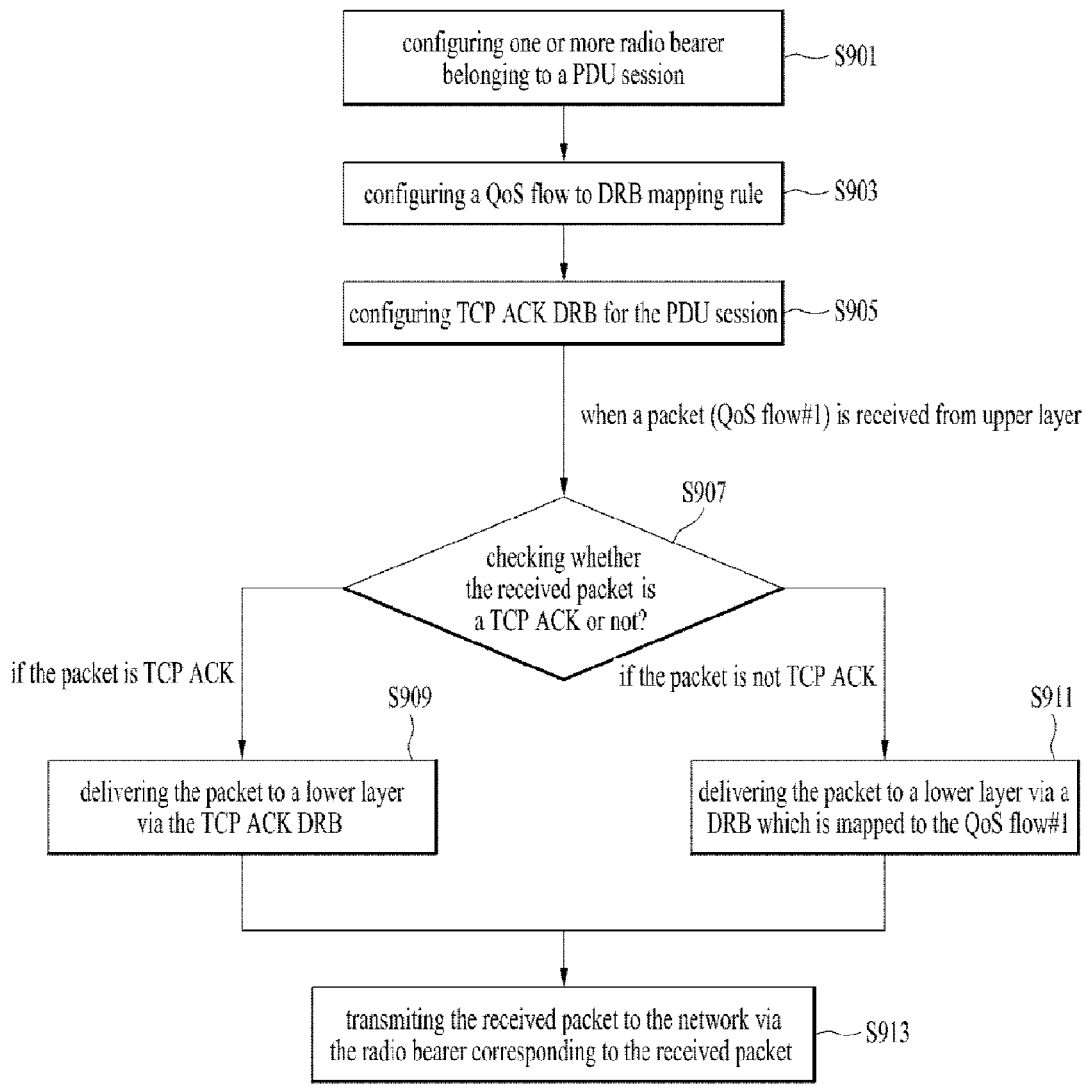

[Fig. 10]
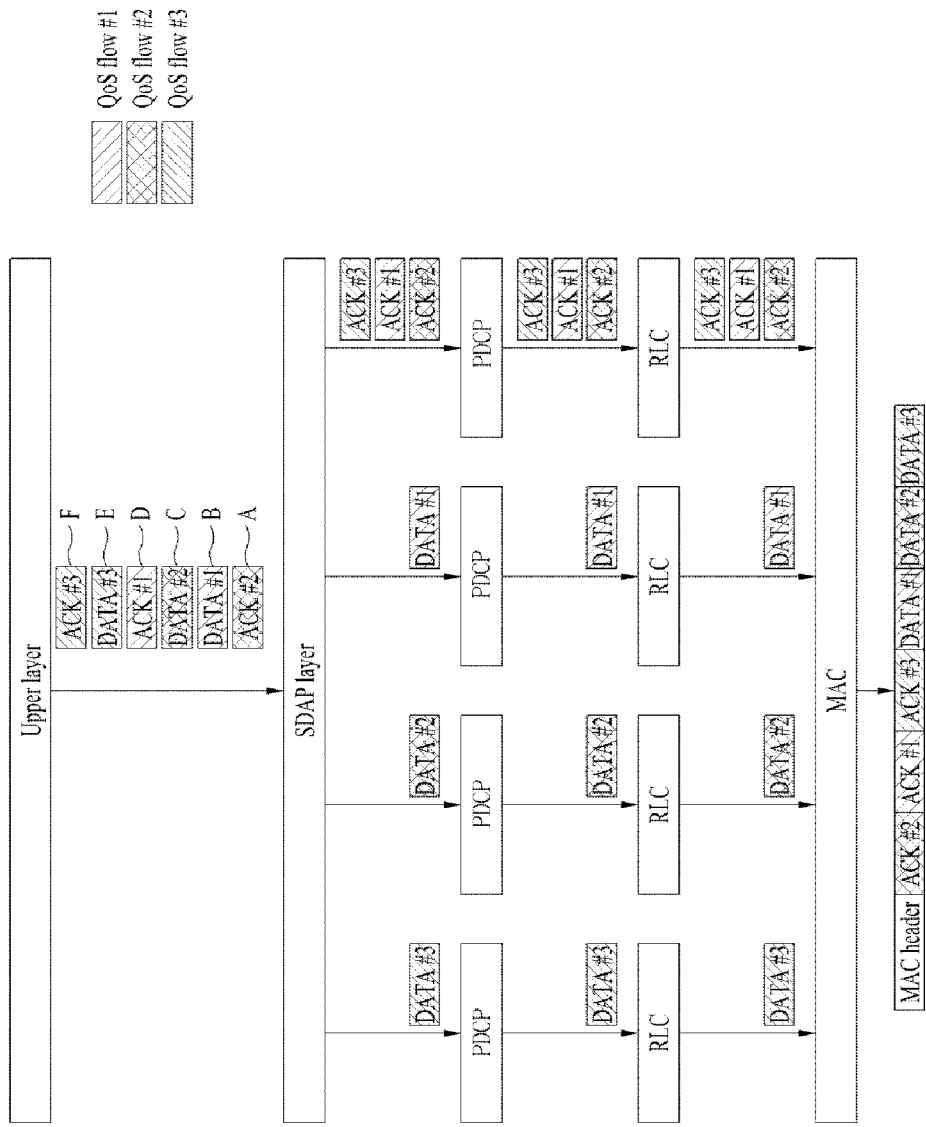

[Fig. 11]
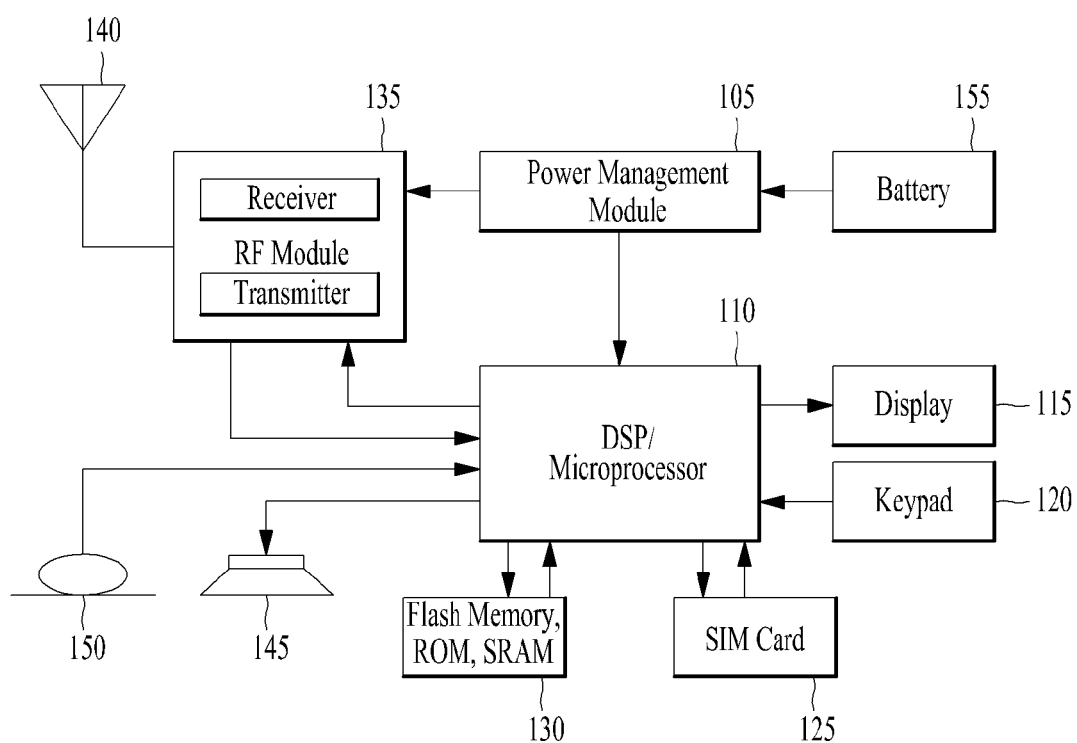

METHOD FOR TRANSMITTING TCP ACK PACKET IN WIRELESS COMMUNICATION SYSTEM AND A DEVICE THEREFOR

CROSS-REFERENCE TO RELATED APPLICATIONS

This application is a National Phase application under 35 U.S.C. § 371 of International Application No. PCT/KR2018/002260, filed on 23 Feb. 2018, which claims priority under 35 U.S.C. 119(e) to U.S. Provisional Application No. 62/465,648, filed on 1 Mar. 2017, both of which are incorporated by reference herein in their entirety.

TECHNICAL FIELD

The present invention relates to a wireless communication system and, more particularly, to a method for transmitting TCP ACK packet in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF INVENTION

Technical Problem

An object of the present invention devised to solve the problem lies in a method and device for transmitting TCP ACK packet in wireless communication system.

The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

It is invented that the UE configures a DRB for transmitting only TCP ACK packet for a PDU session, i.e., TCP ACK DRB. And the UE transmits all TCP ACK packets from all DRBs of the PDU session to the TCP ACK DRB thereby reducing the transmission delay of the TCP ACK packet.

In effect, the reduced delay of these TCP ACKs won't reduce the throughput in the downlink direction, because the achieved throughput may not be less than the underlying data rate over the wireless connection, even if bi-directional data transmission is initiated over TCP.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4A is a block diagram illustrating network structure of NG Radio Access Network (NG-RAN) architecture, and FIG. 4B is a block diagram depicting architecture of functional Split between NG-RAN and 5G Core Network (5GC);

FIG. 5 is a diagram showing a control plane and a user plane of a radio interface protocol between a UE and a NG-RAN based on a 3rd generation partnership project (3GPP) radio access network standard;

FIG. 6 is an example for L2 data flow between a UE and a NG-RAN;

FIG. 7 is a diagram for classification and user plane marking for QoS flows and mapping to NG-RAN resources;

FIG. 8 is a conceptual diagram for 5G QoS model;

FIG. 9 is a conceptual diagram for transmitting TCP ACK packet using a special DRB in wireless communication system according to embodiments of the present invention; and FIG. 10 is an example for transmitting TCP ACK packet using a special DRB according to embodiments of the present invention; and FIG. 11 is a block diagram of a communication apparatus according to an embodiment of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4a is a block diagram illustrating network structure of NG Radio Access Network (NG-RAN) architecture, and FIG. 4b is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP.

The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

FIG. 6 is an example for L2 data flow between a UE and a NG-RAN.

An example of the Layer 2 Data Flow is depicted on FIG. 6, where a transport block is generated by MAC by concatenating two RLC PDUs from RBx and one RLC PDU from RBy. The two RLC PDUs from RBx each corresponds to one IP packet (n and n+1) while the RLC PDU from RBy is a segment of an IP packet (m).

FIG. 7 is a diagram for classification and user plane marking for QoS flows and mapping to NG-RAN resources.

The 5G QoS model is based on QoS flows. The 5G QoS model supports both QoS flows that require guaranteed flow bit rate (GBR QoS flows) and QoS flows that do not require guaranteed flow bit rate (non-GBR QoS flows). The 5G QoS model also supports reflective QoS.

The QoS flow is the finest granularity of QoS differentiation in the PDU session. A QoS Flow ID (QFI) is used to identify a QoS flow in the 5G System. User plane traffic with the same QFI within a PDU Session receives the same traffic forwarding treatment (e.g. scheduling, admission threshold). The QFI is carried in an encapsulation header on N3 (and N9) i.e. without any changes to the e2e packet header. QFI shall be used for all PDU session types. The QFI shall be unique within a PDU session. The QFI may be dynamically assigned or may be equal to the 5QI.

Within the 5G System, a QoS flow is controlled by the SMF and may be pre-configured, or established via the PDU Session Establishment procedure, or the PDU Session Modification procedures.

Any QoS flow is characterized by: i) a QoS profile provided by the SMF to the NG-RAN via the AMF over the N2 reference point or preconfigured in the NG-RAN, ii) one or more QoS rule(s) which can be provided by the SMF to the UE via the AMF over the N1 reference point and/or derived by the UE by applying reflective QoS control, and iii) one or more SDF templates provided by the SMF to the UPF.

The UE performs the classification and marking of UL user plane traffic, i.e. the association of UL traffic to QoS flows, based on QoS rules. These QoS rules may be explicitly provided to the UE (using the PDU Session Establishment/Modification procedure), pre-configured in the UE or implicitly derived by UE by applying reflective QoS.

Reflective QoS enables the UE to map UL user plane traffic to QoS flows by creating UE derived QoS rules in the UE based on the received DL traffic.

A QoS rule contains a QoS rule identifier which is unique within the PDU session, the QFI of the associated QoS flow and a packet filter set for UL and optionally for DL and a precedence value. Additionally, for a dynamically assigned QFI, the QoS rule contains the QoS parameters relevant to the UE (e.g. 5QI, GBR and MBR and the Averaging Window). There can be more than one QoS rule associated with the same QoS Flow (i.e. with the same QFI)

A default QoS rule is required for every PDU Session and associated with the QoS flow of the default QoS rule. The principle for classification and marking of user plane traffic and mapping of QoS flows to NG-RAN resources is illustrated in FIG. 7.

In DL, incoming data packets are classified by the UPF based on SDF templates according to their SDF precedence, (without initiating additional N4 signaling). The UPF conveys the classification of the user plane traffic belonging to a QoS flow through an N3 (and N9) user plane marking using a QFI. The NG-RAN binds QoS flows to NG-RAN resources (i.e. Data Radio Bearers). There is no strict 1:1 relation between QoS flows and NG-RAN resources. It is up to the NG-RAN to establish the necessary NG-RAN resources that QoS flows can be mapped to.

In UL, the UE evaluates UL packets against the packet filter set in the QoS rules based on the precedence value of QoS rules in increasing order until a matching QoS rule (i.e. whose packet filter matches the UL packet) is found. The UE uses the QFI in the corresponding matching QoS rule to bind the UL packet to a QoS flow.

FIG. 8 is a conceptual diagram for 5G QoS model.

As shown in the FIG. 8, multiple user plane traffics (e.g, IP flow) can be multiplexed onto the same QoS flow and multiple QoS flows can be multiplexed onto the same DRB (Data Radio Bearer). In DL, 5GC is responsible for the IP flow to QoS flow mapping and NG-RAN is responsible for the QoS flow to DRB mapping. In UL, the UE performs a 2-step mapping of IP flows, in which NAS is responsible for the IP flow to QoS flow mapping, and AS is responsible for the QoS flow to DRB mapping. In other words, the UE maps an IP flow to a QoS flow according to the QoS rules such as default QoS rule, pre-authorised QoS rule and/or reflective QoS rule which 5GC provides to the UE. And then, the UE maps the QoS flow to a DRB according to the AS mapping rules which the NG-RAN provides to the UE.

The TCP ACK packet is a feedback of received TCP packets, and transmitted in the opposite direction to the TCP packet. In other words, if TCP packet is transmitted in downlink, the TCP ACK packet is transmitted in uplink, and vice versa.

When bidirectional data transfers are initiated over TCP, the throughput achieved may be substantially lower than the underlying data rate over the radio connection. In that case, the achievable throughput becomes a function of not only the data rates, but also the configured receive window sizes at both transmission ends, since the buffering of packets in one direction will cause the TCP ACK packet to be delayed, potentially reducing the data rate in the opposite direction.

Downlink throughput is affected by uplink because when a bidirectional data transfer is initiated, the TCP ACK packet has to share the connection with the TCP data packets which have the same priority in the opposite direction. If the downlink rate is much higher than the uplink rate and uplink/downlink receive window sizes are identical, then the downlink TCP ACKs will be delayed, as they share the data pipe with uplink traffic. In effect, the increased delay of these TCP ACKs will reduce the throughput in the downlink direction, as the sender depends on a steady stream of TCP ACKs to clock out new packets.

The TCP ACK and data packet are also encapsulated into IP packet, and transmitted through L2 (PDCP, RLC, MAC, or new layer) in NR environment. UE sends the TCP packets to network regardless of TCP ACK or TCP data. It means that UE does not support to prioritize processing TCP ACK transmission than TCP data.

FIG. 9 is a conceptual diagram for transmitting TCP ACK packet using a special DRB in wireless communication system according to embodiments of the present invention.

Some terms of this invention are defined as the followings:

PDU session refers to association between the UE and a data network that provides a PDU connectivity service.

PDU connectivity service refers to a service that provides exchange of PDU (Packet Data Units) between a UE and a data network.

QoS rule refers to a set of information enabling the detection of a service data flow (e.g., IP flow) and defining its associated QoS parameters. It consists of NAS-level QoS profile (e.g., QoS characteristics, QoS marking) and packet filters. Three types of QoS rule are Default QoS Rule, Pre-authorised QoS rule and Reflective QoS rule.

QoS rule refers to a set of information enabling the detection of a service data flow (e.g., IP flow) and defining its associated QoS parameters. It consists of NAS-level QoS profile (e.g., QoS characteristics, QoS marking) and Packet filters.

QoS flow refers to finest granularity for QoS treatment.

NG (Next Generation) system consists of AMF (Access and Mobility Management Function), SMF (Session Management Function) and UPF (User plane Function).

The mapping rule refers to a set of information related to the association between QoS flow and the Data Radio Bearer (DRB) transporting that QoS flow.

TCP control bit included in the TCP header indicates whether the packet includes a TCP ACK or not.

It is invented that the UE configures a DRB for transmitting only TCP ACK packet for a PDU session, i.e., TCP ACK DRB. And the UE transmits all TCP ACK packets from all DRBs of the PDU session to the TCP ACK DRB.

A UE is configured by a network with one or more radio bearer belonging to a PDU session (S901).

A new layer, e.g., SDAP (Service Data Adaptation Protocol layer), is configured per PDU session, which is placed above PDCP entities of the PDU session and in charge of routing a packet to an associated radio bearer, i.e., a PDCP entity of the associated radio bearer. And a PDCP entity and an RLC entity are configured per radio bearer.

The UE receives a QoS flow to DRB mapping rule from the network which is used for the PDU session, wherein the QoS flow to DRB mapping rule defines a mapping between a QoS flow and a DRB for the PDU session (S903).

A UE receives TCP ACK DRB configuration information for transmitting TCP ACK packets, wherein the TCP ACK RB is configured for the PDU session (S905). The UE configures the TCP ACK DRB for the PDU session according to the received TCP ACK DRB configuration information.

Preferably, when the UE receives configuration information for configuring one or more radio bearer belonging to a PDU session from a network, the UE can receive the TCP ACK DRB configuration information.

Preferably, the TCP ACK DRB is used for transmitting all TCP ACK packets from all DRBs belonging to the PDU session.

Preferably, the UE receives a TCP ACK DRB configuration information from the network including at least one i) an indication of a TCP ACK DRB, ii) a PDU session identifier associated with the TCP ACK DRB, iii) priority information of the TCP ACK DRB, or iv) configuration parameters for TCP ACK DRB such as Layer1, Layer2, Layer3 parameters.

The Indication of the TCP ACK DRB indicates whether the RB is TCP ACK DRB or not.

The PDU session identifier identifies a PDU session associated with the TCP ACK DRB. In this case, the UE transmits TCP ACKs for all radio bearers belonging to the PDU session identified by the PDU session identifier via the TCP ACK DRB, and for one PDU session, only one TCP ACK DRB is configured, i.e., only one PDU session identifier is associated with the TCP ACK DRB.

The priority information of the TCP ACK DRB is a priority that is to be used for logical channel prioritization procedure in MAC, wherein the priority is as follows: i) the priority is the highest than any other priorities, e.g., 1, regardless of the priority of configured radio bearers; ii) the priority is higher than any other configured radio bearers belonging to the PDU session associated with the TCP ACK DRB, iii) the priority is higher than any other configured data radio bearers belonging to the PDU session associated with the TCP ACK DRB; iv) the priority is higher than any other configured data radio bearers belonging to the PDU session associated with the TCP ACK DRB but lower than any other configured signalling radio bearers.

When the UE receives a packet together with a QoS flow ID identifying the QoS flow of the packet for a PDU session from an upper layer, the UE may perform checking whether the received packet includes a TCP ACK or not only if a TCP ACK DRB is configured for the PDU session (S907).

If the received packet includes a TCP ACK, the UE generates a PDU including the received packet and delivers the PDU to a lower layer via the TCP ACK DRB (S909).

Preferably, the new layer of the UE generates a PDU by attaching a QoS flow ID identifying the QoS flow of the TCP ACK to the received packet, and the new layer delivers the generated PDU to a PDCP entity of the TCP ACK DRB.

If the received packet does not include a TCP ACK, the UE generates a PDU including the received packet and delivers the PDU to the lower layer via a DRB which is mapped to the QoS flow ID identifying the QoS flow of the packet according to the QoS flow to DRB mapping rule (S911).

Preferably, the new layer checks the QoS flow of the received packet, and the new layer determines a radio bearer associated with the QoS flow of the received packet according to the QoS flow to DRB mapping rule of the PDU session, and the new layer generates a PDU by attaching a QoS flow ID identifying the QoS flow of the received packet to the received packet; and the new layer delivers the generated PDU to a PDCP entity of the determined radio bearer.

Preferably, in checking whether the received packet includes a TCP ACK, the new layer may examine a TCP control bit included in the TCP header of the received packet.

Further, that the received packet includes a TCP ACK may mean that the received packet is a TCP ACK.

When the lower layers receive the packet from the new layer, the lower layers perform the corresponding layer 2 procedures, wherein the lower layers include PDCP, RLC, and MAC.

Preferably, the new layer is a SDAP layer which is a higher layer than a Packet Data Convergence Protocol (PDCP) entity of the UE.

The UE transmits the received packet to the network via the radio bearer corresponding to the received packet (S913).

When the network receives a packet via a radio bearer, the new layer of the network delivers the received packet to a QoS flow identified by the QoS flow ID attached to the received packet.

FIG. 10 is an example for transmitting TCP ACK packet using a special DRB according to embodiments of the present invention.

When the UE receives the TCP ACK DRB configuration information indicating that the TCP ACK DRB is a DRB 4, the UE configures that the TCP ACK DRB for the PDU session is DRB 4 according to the received TCP ACK DRB configuration information.

The DRB 4 is used for transmitting all TCP ACK packets from all DRBs belonging to the PDU session.

According to QoS flow to DRB mapping rule, QoS flow #1 is mapped to DRB1, QoS flow #2 is mapped to DRB2, QoS flow #3 is mapped to DRB3.

When the UE receives several packets for the PDU session from the upper layer in order as FIG. 10, the new layer (e.g. SDAP layer) checks the received packet includes a TCP ACK or not.

When the packet A is received from upper layer, the SDAP layer checks the packet A is TCP ACK or not. Since the packet A is TCP ACK, the SDAP layer delivers a PDU including the packet A to a PDCP entity of the DRB 4, although the packet A has QoS flow #2 which is mapped to the DRB 2. In this case the SDAP PDU includes the packet A and an identifier identifying QoS flow #2.

When the packet B is received from upper layer, the SDAP layer checks the packet B is TCP ACK or not. Since the packet B is not TCP ACK, the SDAP layer delivers a PDU including the packet B to a PDCP entity of the DRB 1 which is mapped to the QoS flow #1. In this case the SDAP PDU includes the packet B and an identifier identifying QoS flow #1.

When the packet C is received from upper layer, the SDAP layer checks the packet C is TCP ACK or not. Since the packet C is not TCP ACK, the SDAP layer delivers a PDU including the packet C to a PDCP entity of the DRB 2 which is mapped to the QoS flow #2. In this case the SDAP PDU includes the packet C and an identifier identifying QoS flow #2.

When the packet D is received from upper layer, the SDAP layer checks the packet D is TCP ACK or not. Since the packet D is TCP ACK, the SDAP layer delivers a PDU including the packet D to a PDCP entity of the DRB 4, although the packet D has QoS flow #1 which is mapped to the DRB 1. In this case the SDAP PDU includes the packet D and an identifier identifying QoS flow #1.

When the packet E is received from upper layer, the SDAP layer checks the packet E is TCP ACK or not. Since the packet E is not TCP ACK, the SDAP layer delivers a PDU including the packet E to a PDCP entity of the DRB 3 which is mapped to the QoS flow #3. In this case the SDAP PDU includes the packet E and an identifier identifying QoS flow #3.

When the packet F is received from upper layer, the SDAP layer checks the packet F is TCP ACK or not. Since the packet F is TCP ACK, the SDAP layer delivers a PDU including the packet F to a PDCP entity of the DRB 4, although the packet F has QoS flow #3 which is mapped to the DRB 3. In this case the SDAP PDU includes the packet F and an identifier identifying QoS flow #3.

Each of PDCP entities process SDAP PDUs and a MAC entity associated with the each of the PDCP entities generates a MAC PDU including packets A to F, and transmits the MAC PDU to the network via the radio bearer corresponding to the received packet.

FIG. 11 is a block diagram of a communication apparatus according to an embodiment of the present invention.

The apparatus shown in FIG. 11 can be a user equipment (UE) and/or eNB adapted to perform the above mechanism, but it can be any apparatus for performing the same operation.

As shown in FIG. 11, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 11 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 11 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method performed by a user equipment (UE) operating in a wireless communication system, the method comprising:
    receiving, from an upper layer, a packet with a first Quality of Service (QoS) flow ID for a Protocol Data Unit (PDU) session, wherein a first Data Radio Bearer (DRB) for transmitting only Transmission Control Protocol (TCP) Acknowledgement (ACK) packet is configured for the PDU session;
    checking whether or not the received packet is a TCP ACK packet; and
    based on the received packet being the TCP ACK packet, delivering a PDU including the received packet to a lower layer via the first DRB,
    wherein the first QoS flow ID of the received packet is associated with a second DRB according to QoS flow-to-DRB mapping rule of the PDU session, and
    wherein the first DRB is used for transmitting all TCP ACK packets from all DRBs belonging to the PDU session.

2. The method according to claim 1, further comprising:
    based on the received packet not being the TCP ACK packet, delivering a PDU including the received packet to the lower layer via the second DRB.

3. The method according to claim 1, wherein the first QoS flow ID is delivered with the received packet to the lower layer.

4. The method according to claim 1, wherein the PDU is generated in a Service Data Adaptation Protocol (SDAP) entity which is a higher layer than a Packet Data Convergence Protocol (PDCP) entity of the UE.

5. The method according to claim 1, wherein the first DRB is used for transmitting all TCP ACK packets from all DRBs belonging to the PDU session.

6. A user equipment (UE) configured to operate in a wireless communication system, the UE comprising:
    a transceiver; and
    a processor operably coupled with the transceiver and configured to:
    receive, from an upper layer, a packet with a first Quality of Service (QoS) flow ID for a Protocol Data Unit (PDU) session, wherein a first Data Radio Bearer (DRB) for transmitting only Transmission Control Protocol (TCP) Acknowledgement (ACK) packet is configured for the PDU session, check whether or not the received packet is a TCP ACK packet, and based on the received packet being the TCP ACK packet, deliver a PDU including the received packet to a lower layer via the first DRB, wherein the first QoS flow ID of the received packet is associated with a second DRB according to QoS flow-to-DRB mapping rule of the PDU session, and wherein the first DRB is used for transmitting all TCP ACK packets from all DRBs belonging to the PDU session.

7. The UE according to claim 6, wherein the processor is further configured to:

based on the received packet not being the TCP ACK packet, deliver a PDU including the received packet to the lower layer via the second DRB.

8. The UE according to claim 6, wherein the first QoS flow ID is delivered with the received packet to the lower layer.

9. The UE according to claim 6, wherein the PDU is generated in a Service Data Adaptation Protocol (SDAP) entity which is a higher layer than a Packet Data Convergence Protocol (PDCP) entity of the UE.

10. At least one non-transitory computer-readable storage medium storing instructions that, based on being executed by a processor, control a user equipment (UE) to perform operations comprising:

receiving, from an upper layer, a packet with a first Quality of Service (QoS) flow ID for a Protocol Data Unit (PDU) session, wherein a first Data Radio Bearer (DRB) for transmitting only Transmission Control Protocol (TCP) Acknowledgement (ACK) packet is configured for the PDU session, checking whether or not the received packet is a TCP ACK packet, and based on the received packet being the TCP ACK packet, delivering a PDU including the received packet to a lower layer via the first DRB, wherein the first QoS flow ID of the received packet is associated with a second DRB according to QoS flow-to-DRB mapping rule of the PDU session, and wherein the first DRB is used for transmitting all TCP ACK packets from all DRBs belonging to the PDU session.

* * * * *